United States Patent
Herges et al.

(10) Patent No.: US 7,198,715 B2
(45) Date of Patent: Apr. 3, 2007

(54) DEVICE FOR SEPARATING FLUID MIXTURES

(75) Inventors: Knut Herges, Spiesen-Elversberg (DE); Andreas Busch, Eppelborn (DE)

(73) Assignee: Hydac Filtertechnik GmbH, Sulzbach, Saar (DE)

( * ) Notice: Subject to any disclaimer, the term of this patent is extended or adjusted under 35 U.S.C. 154(b) by 363 days.

(21) Appl. No.: 10/469,753

(22) PCT Filed: May 24, 2002

(86) PCT No.: PCT/EP02/05695

§ 371 (c)(1),
(2), (4) Date: Sep. 4, 2003

(87) PCT Pub. No.: WO02/102489

PCT Pub. Date: Dec. 27, 2002

(65) Prior Publication Data

US 2004/0094460 A1    May 20, 2004

(30) Foreign Application Priority Data

Jun. 16, 2001 (DE) ................................ 101 29 100

(51) Int. Cl.
- *C02F 1/02* (2006.01)
- *C10G 33/00* (2006.01)
- *B01D 1/06* (2006.01)
- *B01D 3/00* (2006.01)
- *B01D 36/00* (2006.01)
- *B01D 35/01* (2006.01)
- *B01D 19/00* (2006.01)
- *B01D 24/12* (2006.01)

(52) U.S. Cl. .......... 210/180; 210/86; 210/104; 210/109; 210/112; 210/120; 210/175; 210/183; 210/188; 210/205; 210/218; 210/241; 210/258; 210/416.1; 96/157; 96/193; 96/201; 96/218; 422/285; 422/288; 208/184; 208/186; 208/187

(58) Field of Classification Search .............. 210/86, 210/104, 109, 112, 120, 175, 180, 182, 183, 210/184, 185, 187, 188, 205, 218, 241, 258, 210/259, 283, 416.1; 95/24, 250, 266, 274, 95/288; 96/157, 193, 201, 218; 208/184, 208/186, 187; 422/285, 288

See application file for complete search history.

(56) References Cited

U.S. PATENT DOCUMENTS 4,089,662 A    5/1978    Williams (Continued)

FOREIGN PATENT DOCUMENTS

DE    19637313    3/1997

(Continued)

*Primary Examiner*—John Kim
(74) *Attorney, Agent, or Firm*—Roylance, Abrams, Berdo & Goodman, L.L.P.

(57) ABSTRACT

A device for separating fluid mixtures, in particular for separating water from oil, includes a vacuum container (10) with several sub-chambers (26, 44, 40). At least one liquid constituent of the fluid mixture can be transported from the vacuum container after separation, by a transport device (12). The other constituents can be extracted from the vacuum container (10) in the form of gas and/or steam, using a vacuum pump (20). One of the sub-chambers (26) of the vacuum container (10) houses a heating device (28, 30), which heats the fluid mixture. The fluid mixture is guided into an additional sub-chamber (40), and is separated into its constituents by traversing a packed bed. Even cold and consequently viscous fluid mixtures can be supplied, due to the heating device, for separation inside the aforementioned vacuum container.

14 Claims, 2 Drawing Sheets

U.S. PATENT DOCUMENTS 5,112,479 A * 5/1992 Srimongkolkul ............ 210/149
6,042,718 A * 3/2000 Bland et al. ................ 208/187
6,383,367 B1 * 5/2002 Grotheim ................... 208/187

FOREIGN PATENT DOCUMENTS

| EP | 0148444 | 7/1985 |
| EP | 0733389 | 9/1996 |
| GB | 848817 | 9/1960 |

* cited by examiner

DEVICE FOR SEPARATING FLUID MIXTURES

FIELD OF THE INVENTION

The present invention relates to a device for separating fluid mixtures, in particular for separating water from oil, comprising a vacuum tank with several sub-chambers. At least one liquid component of the fluid mixture can be transported out of the vacuum tank after separation by a delivery means. The other components can be extracted from the vacuum tank in gas and/or vapor form by a vacuum pump.

BACKGROUND OF THE INVENTION

In a non-generic device for separating an oil/water mixture disclosed in EP 0 148 444 A2, a pre-separation space is provided in which first the coarser components of the oil are separated from the mixture. The mixture precleaned in this way is then delivered to a coalescence chamber containing a plurality of coalescing bodies of an oleophilic plastic and being lighter than water. Extremely fine oil particles also settle on the oleophilic, specifically large surfaces of these bodies, flow together on the bodies and rise as larger, easily separable oil droplets into the separation space where they can collect and can be removed in the oil collection space. The water flows out of the separation space by a partition through another pipe. This device is large. Although oil separation is maintenance-free with the device over a longer time interval, the oleophilic coalescence bodies from time to time must be replaced by new ones. This replacement leads to downtimes of the system. With respect to the size of the system, the discharge performance on the oil and water which have been separated from one another is relatively low. Especially under cold ambient conditions and for moreover cold fluid mixtures to be separated the water removal performance, the rate with which water removal takes place is insufficient.

EP 0 733 389 B1 discloses a generic device for separating fluid mixtures, especially oil and water, with a vacuum tank in which this fluid mixture can be atomized by an atomization means. At least one liquid component of the fluid mixture after its separation can be drained from the vacuum tank. The corresponding other components can be suctioned in gas and/or vapor form out of the vacuum tank by the vacuum pump. The known atomization means has an atomizer nozzle for the fluid mixture. The liquid components can be drained by a hydraulic pump driven by a hydraulic motor, which form a structural unit located within the vacuum tank. The hydraulic motor can be driven by the fluid mixture which can be set into motion by another drive as soon as a definable fill level in the vacuum tank requires discharge of the component which is liquid at the time by the hydraulic pump. Based on the atomization means, it is possible to achieve almost optimum separation of the components with a small structural size of the device. Separation also is economically favorable with respect to energy input. Especially in applications at low and very low temperatures, the atomization means is fault-susceptible and is not especially well suited.

SUMMARY OF THE INVENTION

Objects of the present invention are to provide an improved device for separating fluid mixtures, in particular for separating oil and water, with a low structural size, while retaining the advantages, allowing optimum separation of the components and operating economically favorably, in such a way that it can also be used at low and very low temperatures.

These objects are achieved by a separating device where one of the sub-chambers of a vacuum tank holds a heating means used to heat the fluid mixture which, conveyed to another sub-chamber as it flows through a packed bed, undergoes separation into its components. Cold, and consequently viscous, fluid mixtures can be delivered by the heating means for separation within the indicated vacuum tank. Thus, the separation device of the present invention can be used in construction machinery and military vehicles, where outside of maintenance installations with the corresponding building equipment, and in the field, servicing of the hydraulic fluid can be undertaken by the water being separated from the oil. Another application is for separation of water from gasoline or water from kerosene, for example, in aircraft.

The heating means, preferably in the form of an electrically operated heating means, can be regulated in terms of its heating output, and can be tailored so that in a wide range of temperatures of the fluid mixture it can be handled appropriately in terms of separation within the separation device. Integration of the heating means into one sub-chamber of the vacuum tank causes only a small portion of the heat being released to the vicinity. This arrangement leads to improved efficiency and improves the rate of water removal.

In one preferred embodiment of the device of the present invention, one sub-chamber with the integrated heating means extends along the entire vacuum tank. The second sub-chamber with the packed bed encompasses the first sub-chamber. A third sub-chamber is coaxial to the second sub-chamber, and in the lengthwise direction of the vacuum tank likewise following the second sub-chamber encompasses the first sub-chamber. Division into different sub-chambers within the vacuum tank ensures that the heating means can occupy a large amount of space within the vacuum tank. This arrangement is advantageous in that the fluid mixture can then be routed over a very long section along the heating means. A correspondingly long residence time in the second sub-chamber is ensured by the packed bed so that a longer time interval is available for the separation or gas removal process. Rapid drainage of the separated liquid portions from the vacuum tank to the outside is then possible by the third sub-chamber with the packed bed.

In another preferred embodiment of the device of the present invention, a fourth sub-chamber which extends parallel to the first sub-chamber within the entire vacuum tank. A level monitoring means in the fourth sub-chamber provides information about the fill level of the vacuum tank relative to the respective liquid component. Preferably, the level monitoring means triggers a first delivery means such that when a given fill level boundary is not reached within the vacuum tank, the liquid component leaving the tank is passed onto the first sub-chamber with the heating means. Regardless of the fill level of the separation device and especially of the vacuum tank, it is consequently possible to conduct a continuing separation process which is especially independent of how much fluid mixture to be separated is being supplied from the outside to the separation device. In addition, more or less continuous operation proceeds favorably in terms of energy input. The fluid mixture which has already been separated can again be supplied to the actual separation device to improve the separation results in a further separation process. In this respect, fluid from which the air and water have been almost completely removed leaves the separation device for its further application.

In another preferred embodiment of the device of the present invention, another delivery means by a filter unit withdraws the fluid mixture from a withdrawal point. The first delivery means by a switching means delivers the liquid component to the withdrawal point, or alternatively to the heating means. If the level monitoring means shows that the fill level within the vacuum tank and especially in its fourth sub-chamber is too high, a switching valve is actuated accordingly. By the first delivery means, especially in the form of a motor-hydraulic pump unit, the liquid component is passed directly onto the withdrawal point from which in turn the separation device removes the fluid mixture by the second delivery means. The respective withdrawal point which is shared can be formed, for example, by the fluid tank of a construction machine or a military vehicle, such as a tank or armored personnel carrier.

In another preferred embodiment of the device of the present invention, the vacuum pump with its suction force adjoins the top of the vacuum tank. In the opposite direction, the fluid mixture flow takes place from top to bottom through the second sub-chamber with the packed bed. The arrangement of the vacuum pump which is the top arrangement in this respect and the countercurrent principle within the vacuum tank ensure a high separation rate. Moreover, streamlining is within the vacuum tank for the medium which is flowing at the time is achieved.

In another preferred embodiment of the device of the present invention, the vacuum tank can be connected to an air supply, preferably by a filter unit and an adjustable choke. In this way, purified air in definable amounts can be supplied to the vacuum tank to be able to set and specify the respective negative pressure in the vacuum tank in this way. Preferably, the fluid-carrying connection to the heating means and the parts of the fluid lines in the delivery means are each supplied by a hydraulic pump discharge into a common connecting piece. In this way, the free path and use of pipework can be reduced.

If the device is assembled with all its components to be mobile in a transport unit, the separation device can be used on site. A military application a military vehicle can be repaired and maintained in the open field.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 2:
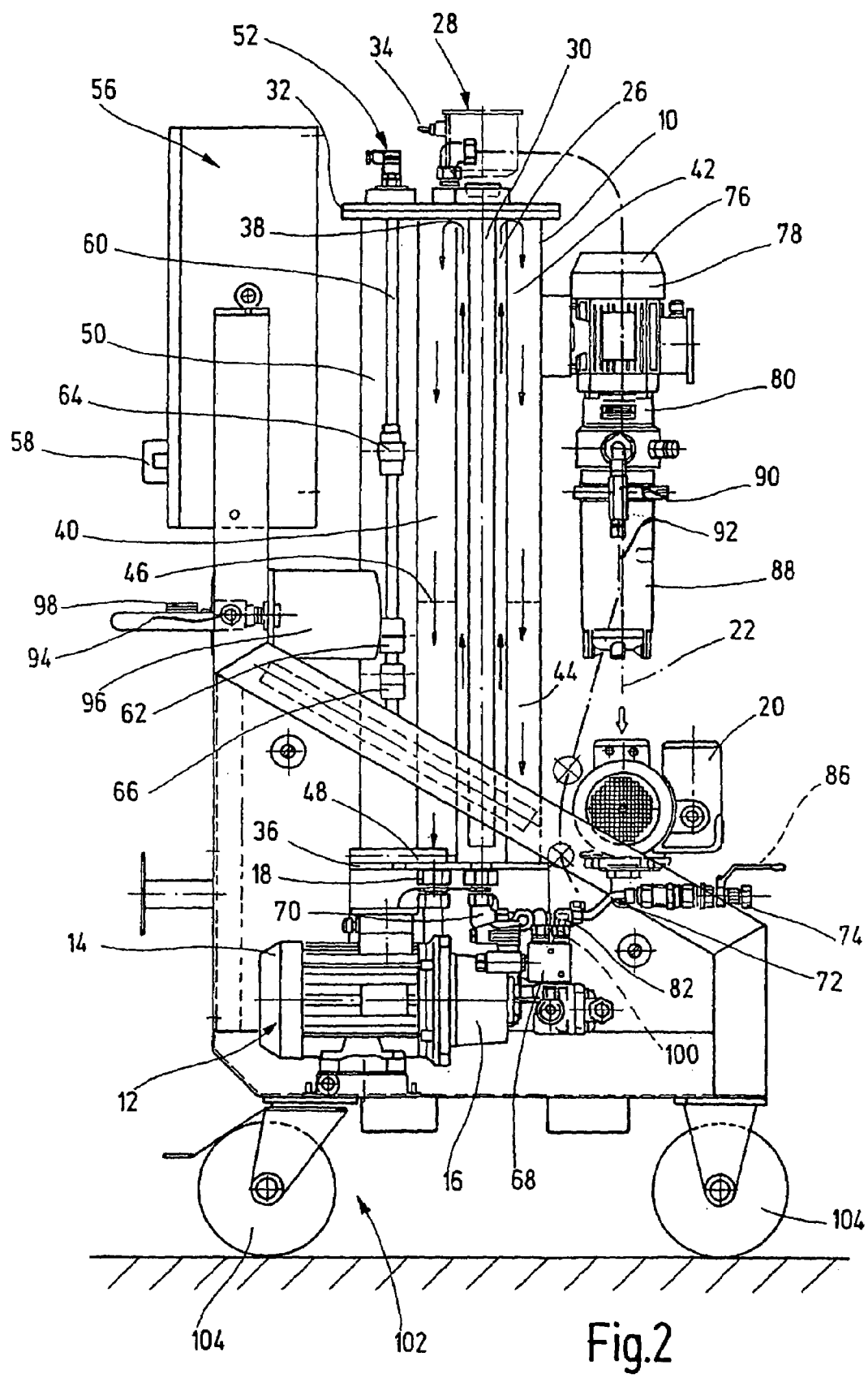
FIG. 2 is a schematic side elevational view of the separation device shown in FIG. 1 configured as a mobile transport unit.

The device for separating fluid mixtures, especially water from oil, has a vacuum tank 10 into which the fluid mixture, e.g., in the form of an oil/water mixture, can be delivered. The liquid component of the fluid mixture, e.g., in the form of oil or another hydraulic medium, after completed separation, can be transported out of the vacuum tank 10 by a first delivery means 12. The first delivery means 12 has a hydraulic pump 16 driven by an electric motor 14. For the respective removal, the first delivery or conveyor means 12 is connected by a pipeline 18 to carry fluid from the bottom of the vacuum tank 10. Furthermore, the separation device has a vacuum pump 20 which is conventional for applications and which is connected by a connecting line 22 (shown only partially in FIG. 2) in the upper part of the vacuum tank 10 to the vacuum pump for carrying fluid. The output 24 of the vacuum pump 20 can be connected to a receiving tank which is not detailed or to another liquid drain line (neither is shown). If the vacuum pump 20 must release air to the vicinity, a corresponding release device can be provided which is not detailed. In any event, water vapor in the form of a gas and/or in the form of steam can be safety released from the vacuum tank 10 by the vacuum pump 20. As can be seen from FIG. 2, the delivery means 12 of the separation device is located as a unit underneath the vacuum tank 10. As a modular component, the vacuum pump 20 is in turn a component of the separation device. In the direction of FIG. 2, delivery means 12 is to the left and below, and is outside of the vacuum tank 10.

As seen from FIG. 2, the vacuum tank 10 is divided into several sub-chambers. The first sub-chamber 26 extends off-center along the entire vacuum tank 10 and is a hollow cylinder. Within this first sub-chamber 26, as part of a heating means 28, an electrically heatable heating rod 30 is provided. The heating rod 30 likewise has a cylindrical outside profile, and fits into the first sub-chamber 26 while maintaining a radial distance. The radial distance established is used for fluid transport of the fluid mixture which is still to be separated. The transport direction of the fluid mixture within the first sub-chamber 26 is indicated with the corresponding arrows. The heating rod 30, viewed in the direction of FIG. 2, with its top end is held by the sealing plate 32 of the vacuum tank 10. The heating rod 30 as part of a heating means is provided with an electrical supply 34.

Fundamentally, the heating rod 30 of the heating means 28 works in the manner of electrical resistance heating, as known from immersion heaters or the like. The cylindrical first sub-chamber 26, on the other hand, viewed in the direction of FIG. 2, has its bottom end resting on a lower end plate 36 sealing the vacuum tank 10 on its bottom. Conversely, on its other end, the first sub-chamber 26 with its outside wall is spaced a distance from the upper sealing plate 32 so that the fluid mixture can leave the first sub-chamber 26 by the separating gap 38 formed by this spacing to be released to the second sub-chamber 40. The respective second sub-chamber 40 is located coaxially to the first sub-chamber 26 and encompasses it with its cylindrical outside wall. In this way, within the second sub-chamber 40, a receiving space 42 is formed to hold a packed bed which is not detailed. The packed bed can be, for example, of special steel material with a plurality of individual filaments or the like to increase the surface for the fluid mixture to be separated in the manner of a shower bed. Furthermore, the residence time of the fluid mixture to be separated in the second sub-chamber 40 is increased by the packed bed. With this longer residence time, more and more time is available for the actual separation process.

By integrating the heating means 28 into the vacuum tank 10, and especially into the first sub-chamber 26, only a small portion of the amount of heat is released to the vicinity. Improved efficiency and an improved rate of water removal are then achieved. By heating the fluid mixture, better separation of the water/oil mixture by the vacuum pump 20 is possible. The vacuum pump otherwise discharges with the free end of its connecting line 22 into the vacuum tank 10, and directly into the second sub-chamber 40 with the packed bed. If the fluid mixture which has been delivered to the first sub-chamber 26 is highly supercooled, the fluid mixture which is to be separated can be heated accordingly. This heating benefits the separation process. Furthermore, it is also possible to treat unusually viscous fluid, as occurs at low temperatures, by the separating device.

In the fluid direction downstream and underneath the second sub-chamber 40, a third sub-chamber 44 is separated by a separating or perforated sheet 46 from the second sub-chamber 40. In this way the packed bed, which is not detailed, can be supported on the top of the separating or perforated sheet 46. Removal of the liquid components of the fluid mixture from which water has been removed to the third sub-chamber 44 is ensured by the separating means 46. The third sub-chamber 44 also in turn encompasses in a coaxial arrangement the first sub-chamber 26 and terminates at its outside diameter flush with the outside diameter of the second sub-chamber 40. The pipeline 18 connected to the first delivery means 12 accordingly fits into the third sub-chamber 44, carrying fluid with its other end. The second and third sub-chambers 40 and 44 extend jointly along the entire vacuum tank 10, with a first end flush with the sealing plate 32 and a second end flush with the end plate 36. On the bottom end of the third sub-chamber 44, an opening 48 produces a fluid-carrying connection to a fourth sub-chamber 50.

Depending on the overall fill level situation within the vacuum tank 10, a corresponding fluid level arises in the fourth sub-chamber 50. A level monitoring means 52 monitors and adjusts the pertinent fill level. For this purpose, the level monitoring means by an electrical terminal located on the top of the sealing plate 32 is connected to a control means 56 having the corresponding control panel inputs and an emergency off function 58.

The level monitoring means 52 within the fourth sub-chamber 50 has a lengthwise rod 60 along which a float-buoyancy body is movably located. Depending on the respective fill level within the fourth sub-chamber 50, the float-buoyancy body location allows a conclusion about the overall fill level situation of fluid within the vacuum tank 10. The float-buoyancy body can move between a minimum position 62 and a maximum position 66. The respective fluid level moves between these positions 62 and 66. An emergency off float 64 is available for safety purposes. Limit switches (not shown) are monitored by the control means 56 to trigger the first delivery means 12 upon reaching the lower limit switch and consequently at a low fill level within the vacuum tank 10 such that the liquid component leaving the vacuum tank 10 by the third sub-chamber 44 is passed directly onto the first sub-chamber 26 with the heating means 28. For this reason, the control means 56 controls a 3/2-way switching valve 68. In its actuated position, switching valve 68 clears or opens the fluid-carrying path between the pipeline 18 and the hydraulic pump 16 to a connecting line 70 which discharges exclusively into the fluid-carrying area of the first sub-chamber 26 by the lower end plate 36.

Figure 1:
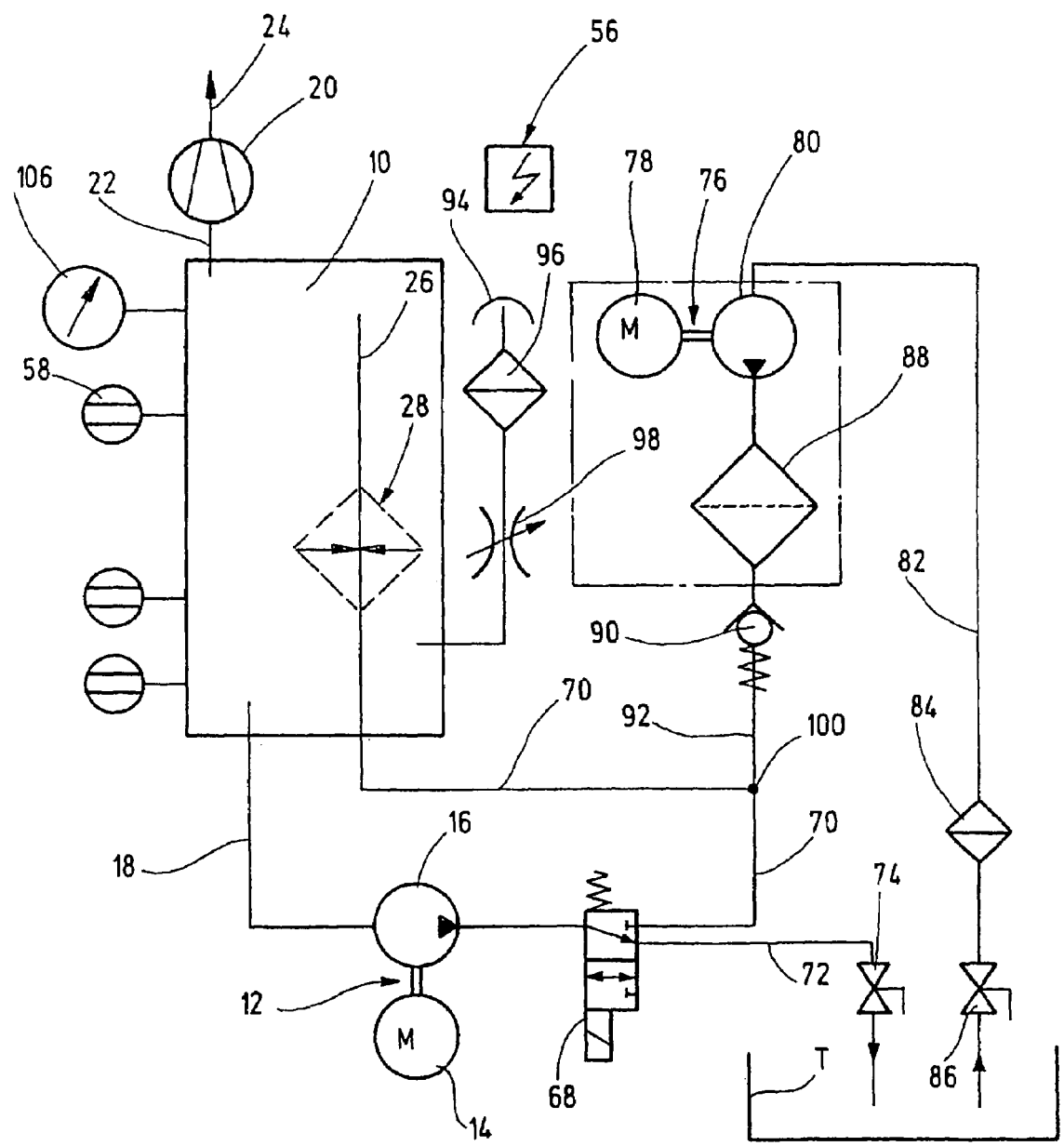
FIG. 1 is a schematic flow diagram of a separation device according to an embodiment of the present claimed invention.

When the float-buoyancy body reaches the top limit switch, the level monitoring means 52 by the control means 56 triggers the 3/2-way switching valve such that it retains its unactuated position shown in FIG. 1. In that position, the pipeline 18 is connected by the hydraulic pump 16 to a drain line 72, as shown, which discharges at its free end via a hand-actuated check valve 74 into a withdrawal point, for example, in the form of a tank T. In the pertinent operating position, the vacuum tank 10 with its sub-chambers cannot be overfilled, with reliable drainage in the direction of the tank T being possible. Consequently, the level monitoring means 52 and the control means 56 can exactly adjust the fill and working states. With undersupply of the vacuum tank 10, the liquid fluid which has already been separated in the sense of an internal closed return flow is routed back to the first sub-chamber 26 with the heating means 28.

To be able to ensure the supply of the vacuum tank 10 with the fluid mixture which is to be separated, the separation device furthermore has a second delivery means 76 with a hydraulic pump 80 driven by an electric motor 78. The motors 14 and 78 can also be ordinary hydraulic motors. The hydraulic pump 80, via a withdrawal line 82, a coarse filter 84 and another hand-actuated shut-off means or valve 86, removes fluid from a withdrawal point in the form of the tank T and conveys the water-containing fluid mixture to a filter unit 88. A spring-loaded nonreturn valve 90 ensures that fluid cannot flow back to the filter unit 88 unintentionally in the opposite direction out of the connecting line 70 and through delivery line 92. Otherwise, this back flow would be possible, for example, if the hydraulic pump 80 did not build up a sufficient fluid pressure. By the second transport or delivery means 76, the supply of the vacuum tank 10, especially the supply of the first sub-chamber 26 with the heating means 28 from the withdrawal point (tank T), is ensured. The withdrawal site or tank T itself can be supplied continuously, but also discontinuously with the fluid mixture which is to be separated from the machine side.

To prevent negative pressure from developing in the vacuum tank 10 and risking the operation of the entire device, the vacuum tank 10 is connected to an air feed 94 having an air filter 96 and an adjustable choke 98. The air feed into the vacuum tank 10 can be dictated by choke 98. Furthermore, air filter 96 ensures that contaminated air could not penetrate into the vacuum tank 10 to adversely affect the separation process there. The fluid-carrying connection 70 to the heating means 28, 30 and parts of the fluid lines 92 of the delivery means 12, 76, which are each supplied by the hydraulic pump 16, 80, discharge into a common connecting piece 100. Connecting piece 100 allows supply of the vacuum tank 10 first by the external supply from the tank T, and then by the inner circulation depending on the fill level within the vacuum tank 10. As shown in, FIG. 2, all the aforementioned components of the device are combined in a mobile transport unit 102, in this case transport on a factory floor, road or the like. The transport unit can have a set 104 of wheels, for example, in the form of four individual wheels. Rail or air cushion operation would also be conceivable.

In addition to removal of water from the oil/water mixture, the device can also be used for comparable fluid mixtures, for example to remove aqueous condensates from aviation fuel (kerosene) in the tanks of aircraft.

In addition to automatic operation of the water removal system, the pressure situation in the vacuum tank 10 can be monitored by a connected pressure gauge 106 (compare FIG. 1). This gauge also aids safety. Within the vacuum tank 10 preferably a working temperature from about 20° C. to about 60° C., depending on the application, is used. An absolute pressure of 22,000 Pa (200 mbar) is set. This pressure setting corresponds to a negative pressure of 80,000 Pa (0.8 bar). Overall the device is set such that a working point in the vicinity of the vapor pressure curve of water develops which is preferably slightly above the vapor pressure curve. A working point slightly above the vapor pressure curve can be easily technically achieved and, in terms of energy, is within acceptable limits. In the area of this working point or working range, the water vapor separates from the oil-water mist in the area of the fluidized bed and can be diverted by the intake area by the vacuum pump 20 out of the vacuum tank 10. The oil mist itself settles on the bottom of the fluidized bed. In the area of the separating or perforated sheet 46, liquid visibly fills the third sub-chamber 44 and the fourth sub-chamber 50 of the level monitoring means 52.

In the separation process, in addition to removing water from oil, removal of gas is also achieved. The gases likewise collect in the intake area of the vacuum pump 20, and in this way are removed at the same time from the vacuum tank 10. The feed line of the fluid mixture to be separated to the heating rod 30 of the heating means 28 in the vacuum tank 10 acts like a heat exchanger and preheats the inflowing fluid mixture. This heating improves the efficiency and water removal rate of the device of the present invention, since only a limited amount of heat per area can be transferred to the fluid mixture without damage occurring. Integrating the heating in the housing parts of the vacuum tank 10 moreover results in a space-saving and weight-reducing construction.

For better understanding, the operation of the entire device is now explained. The hydraulic pump 80 intakes the fluid mixture (oil/water mixture) to be separated from the tank T, and fills the vacuum tank 10 via filter 88 and the first sub-chamber 26 with the heating rod 30. Filtration and heating of the fluid mixture take place if the heating means 28 has been started by the control means 56. Based on the temperature and the set negative pressure, water is then removed from the oil in the vacuum tank 10. At the same time, oil is delivered by the hydraulic pump 16 from the vacuum tank 10, and is supplied depending on the level switch signal of the level monitoring means 52 to the vacuum tank 10 or the tank T from which water is to be removed. If malfunctions occur, especially due to the vacuum tank 10 no longer being filled, the level monitoring means 52, especially by a switch located right at the bottom in the vacuum tank 10, can ascertain the pertinent complete emptying situation for the tank 10 and then undertake emergency shutdown, for example, by the control means 56 turning off the hydraulic pumps 16, 80. As already described, humid air is intaken from the vacuum tank 10 by the vacuum pump and, at the same time, the room air filtered and passing through gas ballast choke 98 can be allowed to flow back into the vacuum tank 10 by the interface 94 and the filter unit 96. As a result of the pressure drop in the vacuum tank 10, the room air is then released and the water vapor partial pressure drops so that water can be removed from the oil.

While an embodiment has been chosen to illustrate the invention, it will be understood by those skilled in the art that various changes and modifications can be made therein without departing from the scope of the invention as defined in the appended claims.

What is claimed is:

1. A device for separating a fluid mixture, comprising:
    a vacuum tank including first, second, third and fourth sub-chambers, said first sub-chamber extending axially substantially along an entire length of said vacuum tank, said second sub-chamber laterally encompassing and being in fluid communication with said first sub-chamber, said third sub-chamber extending coaxially and longitudinally from and being in fluid communication with said second sub-chamber and laterally encompassing said first sub-chamber, said fourth sub-chamber extending parallel to said first sub-chamber along the entire length of said vacuum tank and being in fluid communication with said third sub-chamber;
    an inlet in fluid communication with said first sub-chamber;
    a delivery system coupled to said vacuum tank for transporting at least one liquid component of the fluid mixture out of said vacuum tank following separation from the fluid mixture;
    a vacuum pump coupled to said vacuum tank for extracting other components from the fluid mixture in gas and vapor forms;
    a heating rod within said first sub-chamber and spaced radially from walls thereof for heating the fluid mixture conveyed therethrough before passing into said second sub-chamber;
    a packed bed in said second sub-chamber for separation of components of the fluid mixture; and
    a level monitor in said fourth sub-chamber providing information on fill levels in said vacuum tank of liquid components to be drained.

2. A device according to claim 1 wherein
    a first delivery means connected to and triggered by said level monitor to convey liquid leaving said vacuum tank into said first sub-chamber when an inadequate fill level is signaled by said level monitor.

3. A device according to claim 2 wherein
    a second delivery means connected to a withdrawal point and said first sub-chamber, and including a filter; and
    a switching valve is connected to first delivery means to convey liquid components selectively to said withdrawal point and said first sub-chamber.

4. A device according to claim 3 wherein
    each of said first and second delivery means comprises a hydraulic pump having supply lines and discharging into a common connecting piece with a fluid connection line connected to said first sub-chamber.

5. A device according to claim 1 wherein
    said vacuum pump applies a suction force to a top of said vacuum tank; and
    a downstream end of said first sub-chamber is connected to a top of said second sub-chamber such that the fluid mixture flows in a direction from said top to a bottom of said second sub-chamber.

6. A device according to claim 1 wherein
    an air supply is connected to said vacuum tank.

7. A device according to claim 6 wherein
    said air supply comprises an air filter and an adjustable choke.

8. A device according to claim 1 wherein
    said heating rod is electrically operated.

9. A device according to claim 1 wherein
    said vacuum tank, said delivery system, said vacuum pump, said heating rod and said packed bed are mounted on a mobile transportation unit.

10. A device according to claim 1 wherein
    said sub-chambers comprise hollow tubes.

11. A device according to claim 1 wherein
    each of said sub-chambers is located between an upper sealing plate and a lower end plate.

12. A device according to claim 1 wherein
    said packed bed is in a receiving space in said second sub-chamber separated by a perforated sheet from said third sub-chamber depending from said perforated sheet.

13. A device according to claim 1 wherein
    the fluid mixture being separated is water and oil, with said sub-chambers separating water from oil.

14. A device according to claim 1 wherein
    said first sub-chamber opens into said second sub-chamber adjacent an end of said vacuum tank such that flow in said first and second sub-chambers is in opposite directions.

* * * * *